United States Patent [19]
Beshears et al.

[11] Patent Number: 6,123,455
[45] Date of Patent: Sep. 26, 2000

[54] PHOSPHOR THERMOMETRY SYSTEM

[75] Inventors: David L. Beshears, Knoxville, Tenn.; David N. Sitter, Jr., Tucson, Ariz.; William H. Andrews, Oliver Springs; Marc L. Simpson, Knoxville, both of Tenn.; Ruth A. Abston, Vienna, Austria; Michael R. Cates, Oak Ridge; Steve W. Allison, Knoxville, both of Tenn.

[73] Assignee: American Iron and Steel Institute, Washington, D.C.

[21] Appl. No.: 08/850,239

[22] Filed: May 2, 1997

[51] Int. Cl.⁷ .......................... G01K 11/20; G01K 11/12
[52] U.S. Cl. ............................. 374/161; 374/159
[58] Field of Search .................... 374/141, 161, 374/159; 118/70

[56] References Cited

U.S. PATENT DOCUMENTS

| | | | |
|---|---|---|---|
| Re. 31,832 | 2/1985 | Samulski | 374/131 |
| 2,551,650 | 5/1951 | Urbach | 250/71 |
| 3,591,810 | 7/1971 | Jackson | 250/83 |
| 3,752,404 | 8/1973 | Forsberg | 239/308 |
| 4,075,493 | 2/1978 | Wickersheim | 250/461 R |
| 4,215,275 | 7/1980 | Wickersheim | 250/459 |
| 4,223,226 | 9/1980 | Quick et al. | 250/458 |
| 4,374,328 | 2/1983 | Tekippe et al. | 250/458.1 |
| 4,433,003 | 2/1984 | Gourdine | 239/692 |
| 4,448,547 | 5/1984 | Wickersheim | 374/131 |
| 4,455,741 | 6/1984 | Kolodner | 29/574 |
| 4,459,044 | 7/1984 | Alves | 374/131 |

(List continued on next page.)

FOREIGN PATENT DOCUMENTS

| | | | |
|---|---|---|---|
| 0208414 | 5/1984 | Germany | 374/161 |
| 675043 | 7/1952 | United Kingdom . | |
| 2 064 107 | 6/1981 | United Kingdom . | |
| 2194633 | 3/1988 | United Kingdom | 374/161 |
| WO 86/03293 | 6/1986 | WIPO . | |

OTHER PUBLICATIONS

Baar, J.C., et al., "Using Fluoroptic Thermometry to Measure Circuit Board Temperature in a Processing Oven or Chamber," *Research Disclosure*, vol. 316, No. 082, p. 217 (Aug., 1990).

Bugos, A.R., et al., "Laser–Induced Luminescence of $Gd_2O_2S:Tb^{3+}$ and $La_2O_2S:Tb^{3+}$ Thermophosphors for Remote High Temperature Measurements," IEEE Lasers and Electro–Optics Society Annual Meeting Conference Proceedings, vol. 2, p. 217 (Conference Nov., 1990).

Kingori, W., New Temperature Measurement Technology for Galvannealed Steel, *Iron & Steelmaker*, vol. 22, No. 1, pp. 31–32 (Jan., 1995).

(List continued on next page.)

*Primary Examiner*—G. Bradley Bennett
*Assistant Examiner*—Gail Verbitsky
*Attorney, Agent, or Firm*—Fitzpatrick, Cella, Harper & Scinto

[57] ABSTRACT

An apparatus for measuring the temperature of a moving substrate includes an air gun with a powder inlet port in communication with the outlet port of a powder reservoir, an air inlet port in communication with a pressurized air source, and an outlet nozzle spaced from and directed toward the moving substrate. The air gun is activated by the air pulses to spray controlled amounts of the powdered phosphor onto the moving substrate, where the phosphor assumes the temperature of the moving substrate. A laser produces light pulses, and optics direct the light pulses onto the phosphor on the moving substrate, in response to which the phosphor emits a luminescence with a decay rate indicative of the temperature of the phosphor. A collection lens is disposed to focus the luminescence, and a photodetector detects the luminescence focused by the collection lens and produces an electrical signal that is characteristic of the brightness of the luminescence. A processor analyzes the electrical signal to determine the decay characteristic of the luminescence and to determine the temperature of the phosphor from the decay characteristic.

40 Claims, 11 Drawing Sheets

U.S. PATENT DOCUMENTS

| | | | |
|---|---|---|---|
| 4,560,286 | 12/1985 | Wickersheim | 374/131 |
| 4,592,664 | 6/1986 | Bijlenga et al. | 374/131 |
| 4,652,143 | 3/1987 | Wickersheim et al. | 374/161 |
| 4,679,157 | 7/1987 | Hirano et al. | 364/557 |
| 4,759,033 | 7/1988 | Ariessohn | 374/161 |
| 4,776,827 | 10/1988 | Greaves | 374/161 |
| 4,789,992 | 12/1988 | Wickersheim et al. | 374/161 |
| 4,819,658 | 4/1989 | Kolodner | 128/736 |
| 4,880,972 | 11/1989 | Brogardh et al. | 250/231 |
| 4,885,633 | 12/1989 | Buck | 358/93 |
| 5,063,297 | 11/1991 | Hardenbrook et al. | 250/458.1 |
| 5,107,445 | 4/1992 | Jensen et al. | 364/525 |
| 5,140,609 | 8/1992 | Jensen et al. | 374/161 |
| 5,173,121 | 12/1992 | Hawk et al. | 118/629 |
| 5,211,480 | 5/1993 | Thomas et al. | 374/161 |
| 5,255,980 | 10/1993 | Thomas et al. | 374/161 |
| 5,304,809 | 4/1994 | Wickerheim | 374/161 |
| 5,315,993 | 5/1994 | Alcala | 128/634 |
| 5,332,316 | 7/1994 | Kleinerman | 374/161 |
| 5,351,268 | 9/1994 | Jensen et al. | 374/131 |
| 5,470,155 | 11/1995 | Jenson | 374/161 |
| 5,800,867 | 9/1998 | Matsunaga et al. | 427/236 |
| 5,803,606 | 9/1998 | Petzy et al. | 374/161 |
| 5,858,466 | 1/1999 | Liu et al. | 427/294 |
| 5,882,404 | 3/1999 | Gummer | 118/70 |

OTHER PUBLICATIONS

Steven W. Allison, Michael R. Cates, Bruce W. Noel, George T. Gillies, *Monitoring Permanent–Magnet Motor Healing with Phosphor Thermometry*, IEEE Transactions on Instrumentation and Measurement, vol. 37, No. 4 (Dec. 1988), pp. 637–641.

Michael R. Cates, *New Light on Measuring Temperature*, Oak Ridge National Laboratory Review, vol. 3–4 (1991), pp. 46–55.

K.A. James, V.H. Strahan, W.H. Quick, *Analysis and Preliminary Design of Optical Sensors for Propulsion Control*, Report No. NASA CR–159519 (Jan. 23, 1979), pp. 63–86.

J.S. McCormack, Remote Optical Measurement of Temperature Using Luminescent Materials, Electronics Letters, vol. 17, No. 18 (Sep. 3, 1981), pp. 630–631.

E.M. Fry, Thermographic–Phosphor Surface Temperature Measurement Technique; Application to Integrated Circuits, Symposium on Temperature, $5^{th,}$ Washington, D.C. (1971), pp. 577–583.

Bruce, W. Noel, W. Dale Turley, Steven W. Allison, Thermographic Phosphor Temperature Measurements: Commerical and Defense–Related Applications, Proceedings of the $40^{th}$ International Instrumention Symposium (ISA), Baltimore, MD (May, 1994), pp. 271–288.

Nancy J. Hess, Gregory J. Exarhos, Susanne M. Wood, Laser–Induced Fluorescence in Doped Metal Oxide Planar Waveguides Deposited from Aqueous Solutions, Mat. Res. Soc. Symp. Proc., vol. 244, Materials Research Society (1992), pp. 281–286.

Th. Bosselmann, A. Reule, J. Schröder, Carl Zeiss, Fiber Optic Temperature Sensor Using Fluorescence Decay Time, Second International Conference on Optical Fiber Sensors (SPIE), vol. 514, (1984), pp. 151–154.

C.E. Rogers, L. Bogdan, R.E. Kinzly, J.E. Stratton, A Thermal Mapping Technique for Shock Tunnels and a Practical Data–Reduction Procedure, AIAA Paper No. 72–1031 (1972), pp. 1–9.

"Research and development", Nov. 85, K. Wickerheim et al.

PHOSPHOR THERMOMETRY SYSTEM

This invention was made with Government support under Contract No. DE-FC07-93ID13205 awarded by the Department of Energy. The Government has certain rights in this invention.

FIELD OF THE INVENTION

The present invention relates to a system and method for measuring the temperature of a moving substrate in a harsh environment. More particularly, the present invention relates to a thermometry system and method in which a phosphor is applied to the moving substrate and its temperature is measured using pulse-laser phosphor thermometry.

BACKGROUND OF THE INVENTION

Hot dip galvannealed steel ("HDGA") is extensively used in the automotive industry because it has superior weldability, paintability and cosmetic corrosion resistance after painting, as compared to, for example, pure zinc coated steel. Galvannealing process conditions must be controlled tightly in order to produce high quality HDGA products. One very important process parameter which affects HDGA product quality greatly is the galvannealing temperature.

Reliable temperature measurements enable more complete characterization of the galvannealing process, so that a dynamic model can be developed to control the process. Process variations that affect surface temperatures of galvanneal during processing directly impact the quality of the end-product steel. Several parameters, such as sheet thickness, sheet speed, and power to the induction furnaces, each of which affects the temperature, will vary during production. Hence, if they can be controlled in real time, it will be possible to improve the quality of the end product. Better technology for temperature monitoring can lead to enhanced product quality and consistency, and reduce process spoilage.

It is therefore desired to develop a system for the in-process measurement of galvanneal steel strip temperatures. The subject invention was developed specifically for galvanneal strip temperature measurement, but is equally applicable to other environments.

Infrared pyrometry is sometimes used as a temperature indicator for galvanneal processing. However, the accuracy of pyrometry depends directly on a surface's emissivity. Because the emissivity of the molten layer of zinc on the sheet varies rapidly during the process, pyrometry can introduce considerable uncertainty.

We are aware of no accurate in-process means of measuring galvanneal steel surface temperature which is independent of emissivity. In many steel monitoring applications, high temperatures, unknown emissivities, moving and molten surfaces, hazy viewpaths, and environments inimical to most types of instrumentation combine to undermine accurate thermometry. The subject invention addresses these problems by implementation of a unique system based on thermally sensitive luminescence.

Thermographic phosphors are relatively inert, doped ceramics that emit light with a distinctive spectral distribution when suitably excited by an energy source such as an electron beam, x-ray emission, or ultraviolet light. If the source is transient or pulsed, then the luminescence will have a characteristic decay rate or decay lifetime, i.e., persist for a characteristic duration after cessation of the excitation radiation. These luminescence properties change with temperature. These changes are independent of the emissivity of the surface to which the luminescing material is attached. Other related luminescence properties, such as, for example, emission intensity or phase shift, may be exploited to ascertain temperature. However, the present invention is based on decay rate measurements that do not require intensity calibration, because they therefore tend to retain calibration better than other measurements, such as those required for other approaches.

Figure 1:
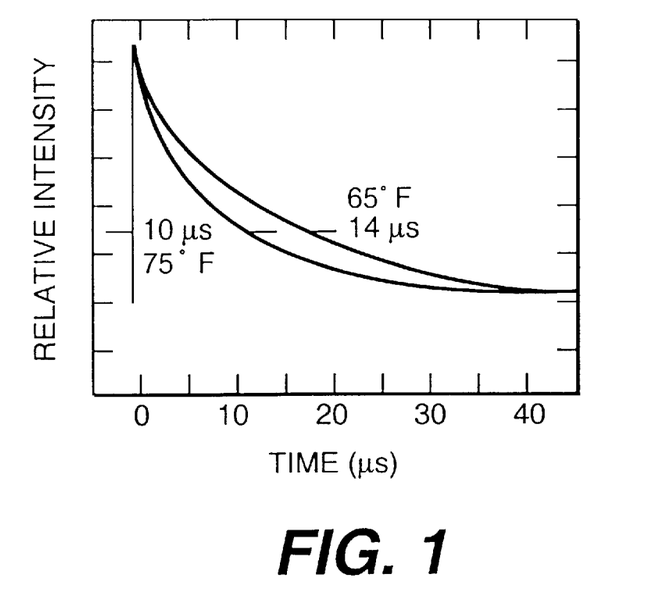
FIG. 1 is a graphical representation of luminescence decay as a function of time for a representative phosphor at two temperatures.

During the decay period, the brightness of the luminescence decreases exponentially. The time it takes the brightness to fall by a factor of 1/e (wherein e is the base of the natural logarithm) is termed the "decay time." FIG. 1 illustrates this phenomenon for a representative phosphor. Note that the rate of decrease is more rapid at the higher temperatures. Provided the decay is described by a single exponential and there are no chemical reactions altering the phosphor, the decay time is a single-valued function of temperature over a wide and useful range of temperatures.

It is well known to measure temperature using luminescence decay rates. For many years, phosphors have been applied to various substrates or in various environments in order to determine temperatures that were otherwise impractical to measure. However, we are aware of no system which addresses the problems encountered in environments such as a galvannealing process line. In galvannealing, it is not practical to apply a phosphor to the material at the beginning of the process and later test its luminescence, because the steel surface must be clean as it enters the zinc bath. Thus, the phosphor cannot be applied until after the steel exits the bath. This point in the process, after the steel has exited the zinc bath, is where it is particularly important to obtain a temperature reading. Therefore, it would be helpful if the phosphor could be deposited onto the galvanneal sheet after it has exited the bath.

Adding to the difficulty of depositing the phosphor to the steel at this stage of the process, is that it is difficult to predict exactly how the sheet will be moving. Not only do speeds vary, but the sheet may not be uniformly thick or flat at this juncture, and will probably be wobbling as it moves.

Thus, there is a need in the art for a phosphor-based thermometry system in which the phosphor is deposited on a moving substrate to be monitored.

There is a further need for such a thermometry system which can accommodate a substrate that is moving unpredictably.

There is also a need for such a thermometry system which can deposit the phosphor in a harsh environment to a hot substrate.

SUMMARY OF THE INVENTION

One aspect of the present invention relates to an apparatus for measuring the temperature of a moving substrate, including a pressurized air source and a switching valve connected to an output of the pressurized air source to produce air pulses. A powder reservoir contains a phosphor and has an outlet port. An air gun has a powder inlet port in communication with the outlet port of the powder reservoir, an air inlet port in communication with the pressurized air source, and an outlet nozzle spaced from and directed toward the moving substrate. The air gun is activated by the air pulses to spray controlled amounts of the powdered phosphor onto the moving substrate, where the phosphor assumes the temperature of the moving substrate. A radiation source produces radiation pulses, and optics direct the radiation pulses onto the phosphor on the moving substrate, in response to which the phosphor emits a luminescence with a decay rate indicative of the temperature of the phosphor. A collection lens is disposed to focus the luminescence, and a photodetector detects the luminescence focused by the collection lens and produces an electrical signal based on the luminescence. An oscilloscope provides a digital output signal based on the electrical signal from the photodetector. A processor analyzes the digital output signal to determine the decay characteristic of the luminescence and to determine the temperature of the phosphor from the decay characteristic.

The objects, features and advantages of the present invention will be better understood with reference to the drawings, in which like reference numerals indicate like elements.

DETAILED DESCRIPTION OF THE INVENTION

Figure 2:
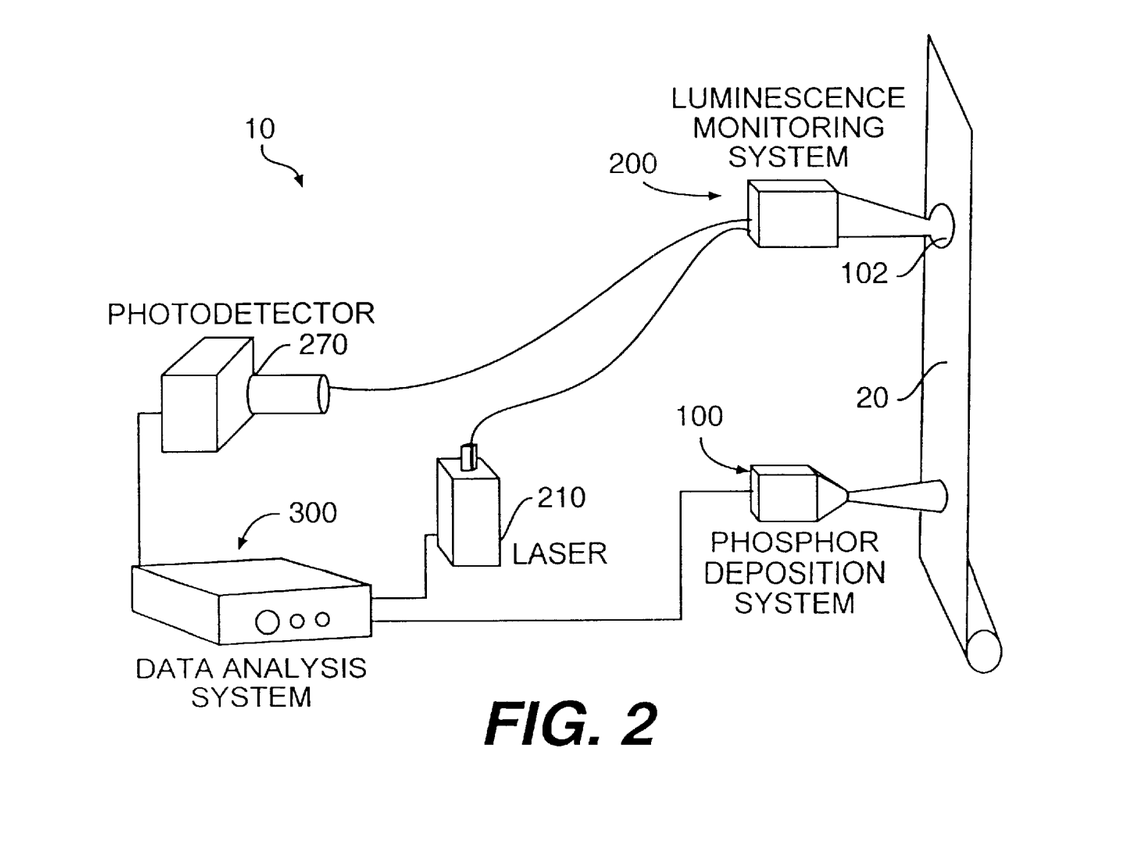
FIG. 2 is schematic diagram of a phosphor thermometry system of an embodiment of the present invention.

Referring by way of example to FIG. 2, the phosphor-thermometry based system 10 of the present invention measures the temperature of the underlying material by depositing a thin film of a powdered phosphor, exciting the phosphor with an energy source, and measuring the time it takes for the resultant luminescence to decay. The system 10 will be described in the context of a galvanneal process, but applies equally to other environments.

FIG. 2 is a block diagram showing the components of the phosphor thermometry system of the present invention. The invention includes a phosphor deposition system 100, a luminescence monitoring system 200, and a data analysis system 300. The phosphor deposition system 100 deposits small amounts of thermally sensitive phosphor 102 onto a moving galvanneal sheet 20. The luminescence monitoring system 200 includes optics located far enough downstream of the phosphor deposition system 100, generally by more than about 5 feet, that the phosphor 102 has assumed the temperature of the galvanneal sheet 20. The optics direct pulsed excitation energy, preferably a pulsed laser beam from a laser 210, onto the deposited phosphor 102 and collect the generated luminescence. A photodetector 270 detects the luminescence, and the data analysis system 300 interprets the luminescence on the basis of calibration data to determine the temperature of the galvanneal 20.

Figure 3A:
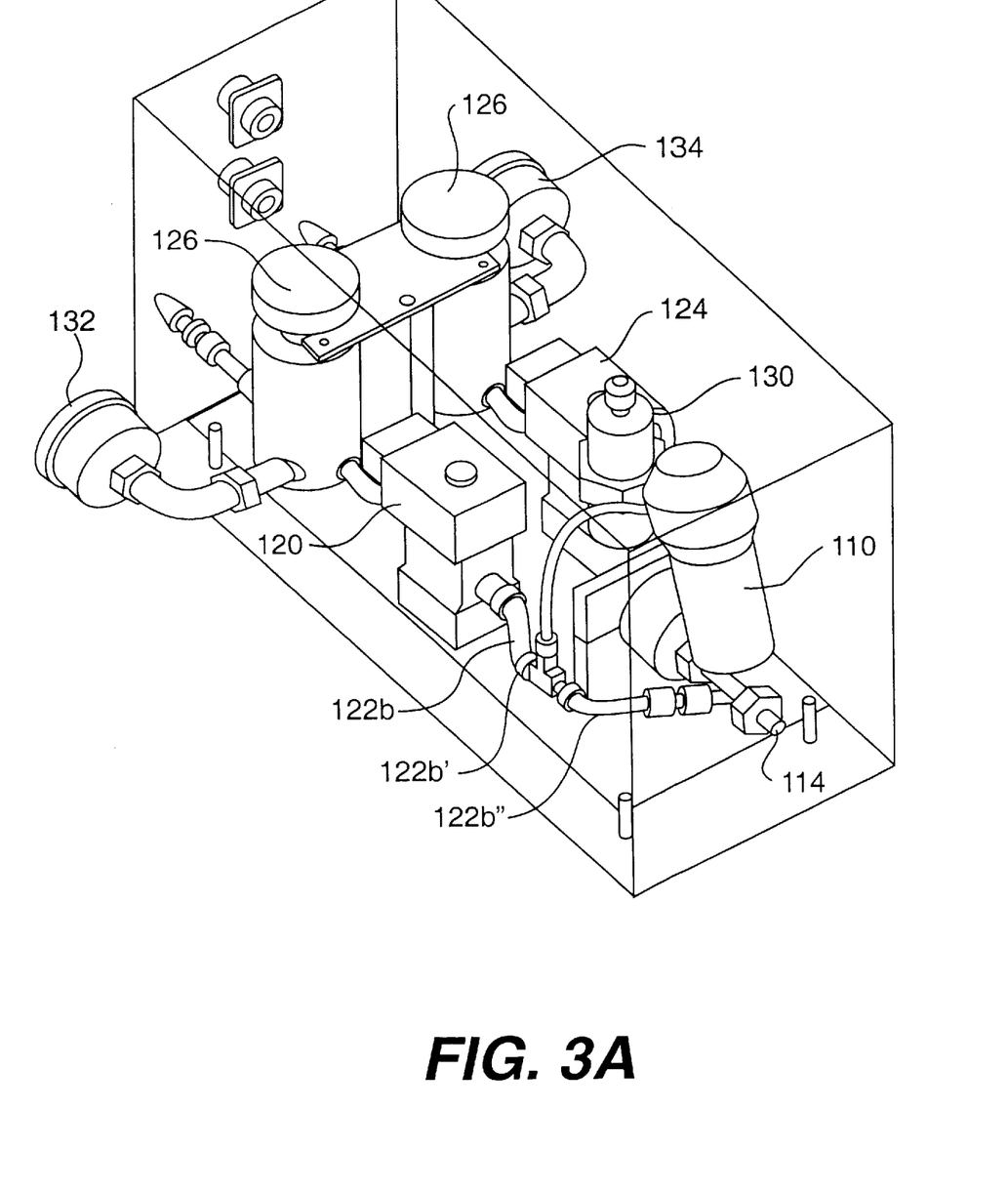
FIG. 3A is perspective view of a phosphor deposition system of an embodiment of the present system.
Figure 3B:
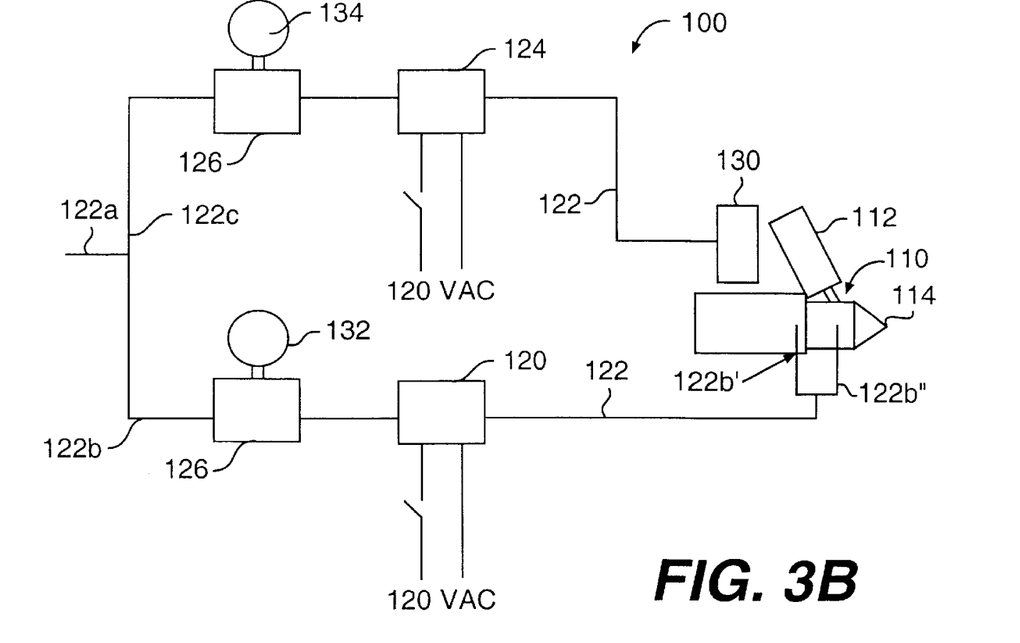
FIG. 3B is a schematic diagram of the phosphor deposition system of FIG. 3A.

FIG. 3A is a perspective view and FIG. 3B is a schematic block diagram of the preferred embodiment of the phosphor deposition system (PDS) 100, which includes a pulsed-air spray gun 110 with a phosphor powder reservoir or feed cup 112. A metering configuration, discussed in more detail below, inputs a consistent amount of phosphor from pulse to pulse. An electric signal actuates a servo-driven valve 120 connected to standard industrial compressed air lines 122 to deliver air pulses to the spray gun 110.

Figure 4:
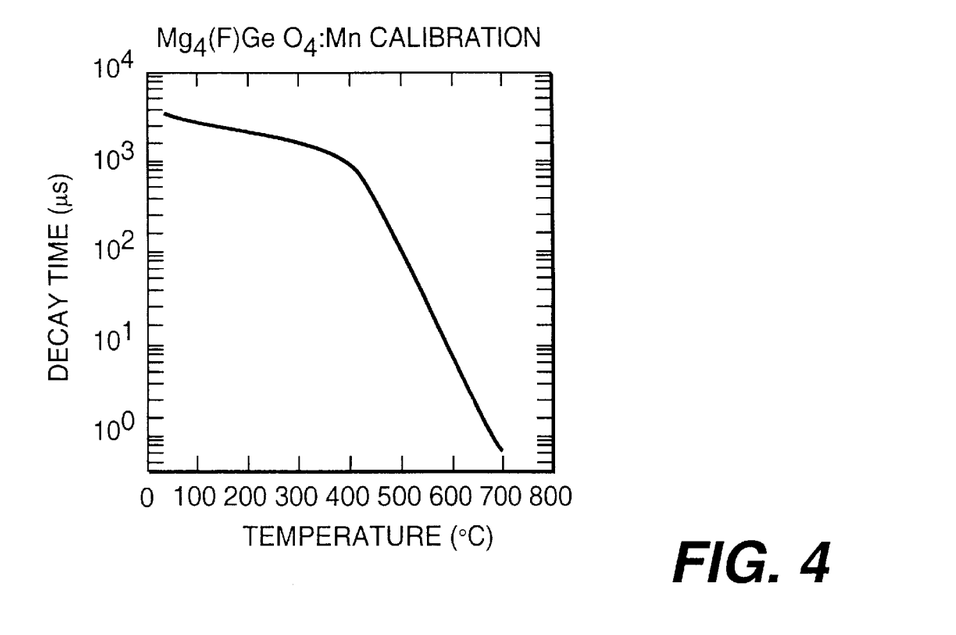
FIG. 4 is a graphical representation of decay time as a function of temperature for a particular phosphor.

The phosphor itself may be any of a number of phosphors which have been cited in the open literature and which luminesce in the manner described above. The preferred phosphor for use in galvanneal thermometry is crystalline $Mg_4(F)GeO_6$:Mn, which exhibits moderately high temperature capability. FIG. 4 shows a typical plot of temperature versus decay time for this phosphor. This phosphor, as seen in this plot, exhibits a generally linear relationship between luminescence decay time and phosphor temperature over the range of approximately 450 to 700° C., making this phosphor acceptable for temperature measurements in this range. Other phosphors which exhibit appropriate decay-temperature characteristics in the range of temperatures encountered in galvannealing (450 to 700° C.) are $YVO_4$:Eu, $YVO_4$:Dy, $Y_2O_3$:Dy, and $Y_2O_3$:Eu. The material is preferably powdered, so that the PDS can eject controlled amounts, but may be in other forms.

The choice of the particular phosphor determines the temperature range within which the instrument can provide accurate temperature measurements. For each temperature range, there are typically several reasonable choices of available phosphors. For examples of known suitable phosphors, see Michael R. Cates, *New Light on Measuring Temperature*, OAK RIDGE NAT'L LAB REVIEW, vol. 3–4 (1991), pp. 46–55, which we incorporate by reference.

Figure 5A:
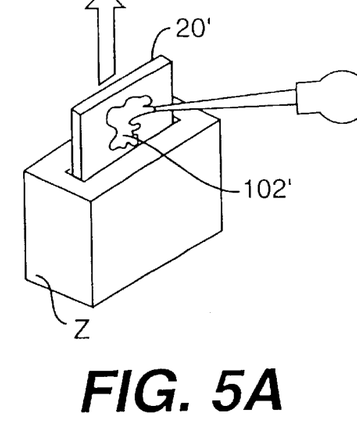
FIG. 5A is a schematic illustration of a test performed illustrating utility of a phosphor deposition technique of the present invention.
Figure 5B:
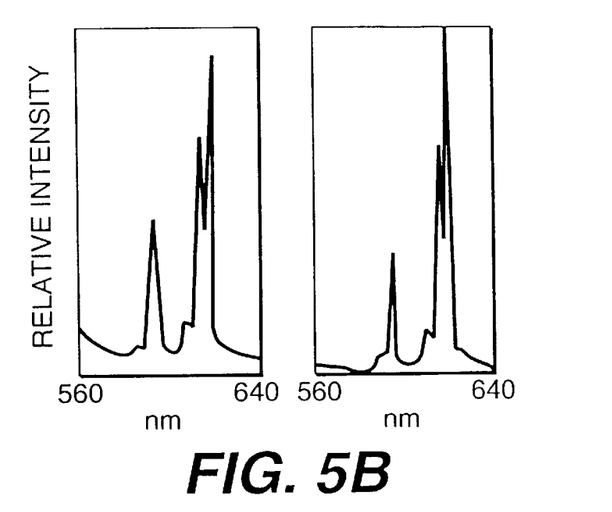
FIG. 5B shows comparative plots of a pure phosphor and a phosphor applied in the test illustrated in FIG. 5A.

One concern in the development of the system of the present invention was whether a sufficient amount of phosphor powder would adhere to the molten surface layer of galvanneal as a sheet emerges from a zinc bath. Another was whether the properties of either the phosphor or steel itself would be adversely affected by the deposition. In order to answer these questions, the test schematically illustrated in FIG. 5A was performed. A test strip of steel 20' was immersed in a molten zinc bath Z and retracted when it reached galvanneal temperature (approximately 470° C.). Phosphor dust 102', in this case, crystalline $YVO_4$:Eu, was gently puffed onto the surface of the test strip as it was retracted. This test demonstrated that the powder could be applied to the galvanneal strip and still luminesce. Subsequent analysis of the luminescence showed that there was no discernible chemical reaction between the phosphor and the strip, nor was there any effect on the physical characteristics of the steel. FIG. 5B shows luminescence spectra from a pure phosphor powder sample (on the right) and the phosphor adhering to the galvanneal specimen (on the left). Luminescence from the phosphor on the specimen was weaker than for the pure powder, but when normalized, these spectra are virtually identical in shape. The slightly increased signal near 560 nm for the specimen sample is due to scatter light and the high gain of the photodetection circuitry used.

Returning to FIGS. 3A and 3B, any of a number of different types of spray guns can be used. The pulsed air spray gun 110 of the preferred embodiment is a model ABX-AUSARS-1 from Paasche. The feed cup 112 is oriented to feed powder to the spray gun by gravity through a bore in the gun. The bore is selectively sealed by a spring-loaded needle, which can be retracted to permit powder to flow through the bore. The needle in the bore is attached to a metal bellows piston in the gun. A feed control dial adjusts the distance the needle can retract, controlling the rate at which powder can flow through the bore. This feed control dial can generally be set to achieve a desired powder pattern on the steel. Lower material feed control dial settings produce more consistently shaped spots. However, these spots can be relatively small, requiring more precise alignment of the laser and accommodating less lateral steel movement than with larger spots. Higher settings produce larger spots, but their shape might not be as consistent from pulse to pulse.

The powder deposition system 100 includes peripheral equipment in addition to the automatic spray gun 110. This peripheral equipment includes a pneumatic vibrator 130, which agitates the spray assembly to assist the gravity feed of powder. Compressed air is fed to the system by a common line 122a, which is connected to lines 122b, 122c by a T-connection or the like. Line 122b is likewise split into cylinder actuation and atomization lines, 122b' and 122b", respectively. Solenoid valves 120, 124 control the supply of compressed air through line 122b to the gun 110 and through line 122c to the vibrator 130. In addition to the solenoid 120 controlling the flow of air to the automatic spray gun, another solenoid valve 124 turns on and off the air supply to the vibrator 130.

In operation, compressed air is sent to the spray gun, where it forces back the metal bellows piston, which in turn retracts the needle to permit powder to flow through the bore. In addition, air is directed through an orifice just before the powder inlet to create suction, like a venturi eductor. Therefore, the air pressure which blows powder out of the gun also draws powder through the bore.

An inlet is provided through which the atomizing air from the atomization line 122b" is directed into the gun. An air cap within the gun directs the flow of atomizing air toward the exit of a nozzle 114. The atomizing air is directed toward the powder as it is blown through the nozzle 114. This breaks up any clumps and provides a better powder distribution. When the air pressure is cut off to the gun, the piston returns the needle to its closed position.

Two pressure regulators 126 control the air pressure in each line 122b, 122c. The motive compressed air pressure in line 122b used to open the needle valve in the spray gun and propel powder to the strip can be generally in the operating pressure range of approximately 30 to 60 psi, preferably around 55 psi. Excess pressures may result in material being driven back into the piston cylinder, where it can accumulate and impede the operation of the bellows piston and impair the operability of the spray system. On the other hand, if the pressure is set too low, the gun will not deposit enough powder per spray to obtain accurate and meaningful readings. Also, at lower pressures, less force will propel the powder to the strip surface, and random air turbulence in the vicinity of the strip can more profoundly affect the distribution of powder. The compressed air supplied via line 122c to the vibrator 130 need not be at such a high pressure, and can be at around 20 to 30 psi.

These components can be commonly mounted. In the preferred embodiment, the entire PDS is encased in a stainless steel box approximately 6 inches wide, 9 inches high, and 15 inches deep. Two pressure gauges 132, 134 are mounted external to the box to provide a visual indication of the air pressure delivered to the spray gun and the vibrator. The box as a unit will have two fittings for compressed air, and two electrical connections for solenoid valve actuation.

The position of the nozzle relative to the strip affects the size of the resulting phosphor spot. The farther the gun is from the strip, the more widely the powder is distributed—i.e., the larger the spot. While a larger spot may be easier to target with the laser, the greater the distance from nozzle to strip, the more likely it is that random turbulence in the vicinity of the strip will blow the powder around and impede the formation of a useful spot. The powder gun should preferably be mounted so that the nozzle is located within approximately 6 inches of the nominal position of the strip.

Figure 6:
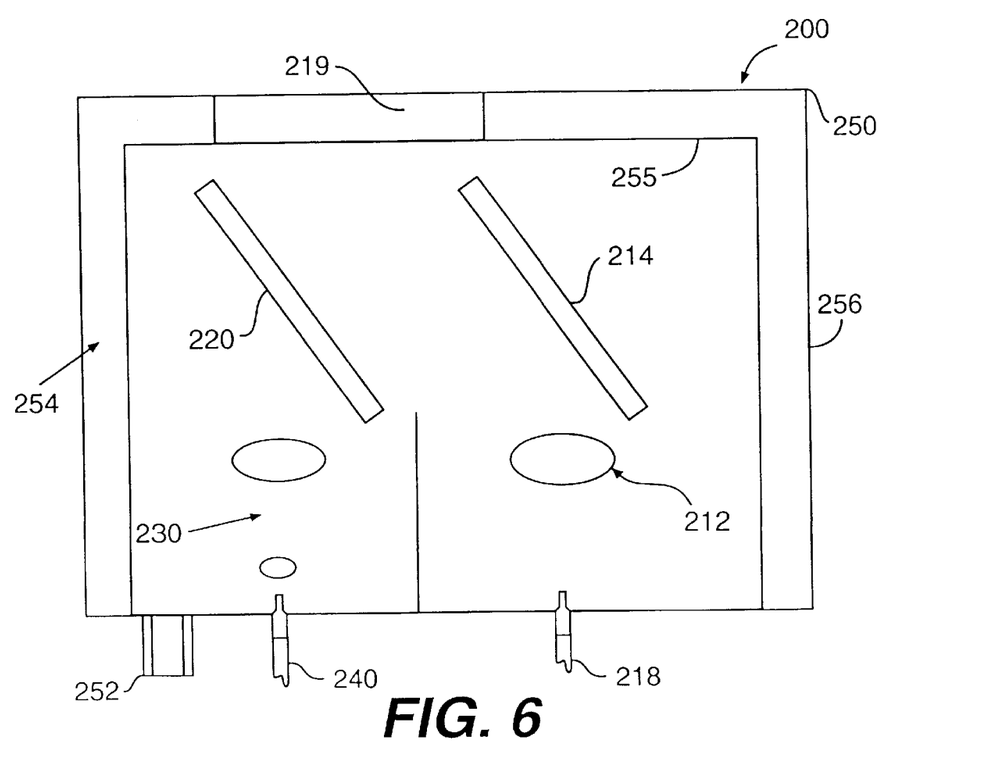
FIG. 6 is a schematic illustration of an embodiment of a luminescence monitoring system of the present invention.

The luminescence monitoring system (LMS) 200, illustrated schematically in FIG. 6, includes the necessary optics to direct transient excitation energy from the irradiation source (not shown) onto the deposited phosphor. The irradiation source can, for example, be any of a number of known or commercially available lasers, preferably a pulsed ultraviolet laser. This embodiment employs a small nitrogen gas laser (337 nm output wavelength). It will generally be connected by fiber optics 218 or the like to appropriate lenses 212 and mirrors 214, 220 to focus the beam through a quartz window 219 onto the phosphor deposited on the galvanneal surface. Any of several combinations of optics and data acquisition equipment can be utilized as needed.

The luminescence monitoring system is generally downstream and in line with the location on the surface to which the phosphor is applied. Generally, several pulses are directed onto each phosphor region, so that a number of samples can be accumulated and analyzed to generate accurate readings. The laser can be pulsed at any suitable frequency, dependent on the speed of the moving substrate. In a typical galvanneal process, strip speeds can vary from approximately 0.1 meter/second (20 feet/minute) to about 2.0 meter/second (390 feet/minute). Pulsing the laser at 15 Hz has been shown to work well with steel speeds of typical lines.

Not only must the laser be aimed at the phosphor on the steel, but it must be in line with the mechanisms that detect the fluorescence. A dichroic mirror 220 can be employed to ensure alignment of the excitation laser beam onto the optical axis of a luminescence detecting arrangement, and servo mechanisms (not shown) can adjust the dichroic mirror 220 to maintain and control overall optical system alignment, as is well known in the art.

Suitable collection lenses 230 can be employed to collect and direct the produced luminescence to a large-core light guide 240. The collection lenses 230 should have a depth of field sufficient to correct for oscillations of the steel surface. Deviations in the flatness of the strip and the tendency of the strip to wobble typically cause the plane of travel to fluctuate as much as 4 inches in either direction. The guide 240 is preferably an optical fiber. A large core optical fiber is most preferred. Plastic or liquid core optical fibers have proven suitable. Glass core fiber may also be used but is more expensive. The length of the light guide will vary, depending on where the detecting arrangement and data analysis system are located.

The above-described lenses and mirrors can be provided together in an optical head 250. Such an optical head for use in a galvannealing process should be designed and fabricated to withstand the environment near the induction furnaces. In typical processes, temperature in the vicinity where the deposition system and optics head will be located (ambient temperatures) will be in the range of about 10° C. (50° F.) to 125° C. (257° F.). The operating ambient humidity range in the process area is 10% to 90% (non-condensing). The process area typically has significant airborne particles, including fine zinc dust. Induction furnaces (used to melt the zinc) produce strong electromagnetic fields with frequencies around 8 kHz. In order to withstand this harsh environment, the optical components can be contained within a rugged aluminum housing 255 that is cooled internally by a stream of clean air through tube 252. The housing can be further wrapped with insulating material 254 and covered by a thin, protective aluminum shell 256.

The detecting arrangement includes appropriate narrow band filters to isolate the appropriate wavelength spectrum of the luminescence. A photomultiplier 270 or similar high-gain optical detector detects the luminescence. The photodetector 270 may be disposed near the luminescing surface. As discussed, the optical system can be packaged and engineered to be rugged enough to withstand a wide range of operating environments, such as high temperatures, dust, etc. However, in addition to these basic physical conditions from which the hardware must be protected, the environment in close proximity to the steel poses another problem. If the detector is too close to the galvanneal, the detected signal will generally include large amounts of radio frequency interference (RFI) from the induction heaters. While the RFI can be accounted for in the subsequent data manipulation, this problem can be eliminated simply by isolating the detector from the heaters through fiber optics.

In general, photomultipliers typically exhibit high gain, but they saturate at high currents, with the saturation current being inversely related to the gain. High gain is a desired characteristic for detecting the luminescence. However, a high saturation current is also desired. The factory lighting and the high reflectivity of the steel sheet will most likely produce unavoidable and significant background noise in the signal. In some instances, the blackbody emission from the steel substrate will add to the background noise. Therefore, the photomultiplier chosen should exhibit high enough gain to detect the luminescence and high enough saturation current to withstand the background light.

The detector outputs an electrical signal indicative of the fluorescence intensity via coaxial cable to the data analysis system 300, which interprets the luminescence on the basis of calibration data, determines a temperature, and displays the information relevant to the particular temperature measurement being undertaken.

The location of the data analysis system (DAS) 300 is dependent on similar concerns as with the photodetector 270, as well as practical factors like where control rooms or other measurement stations may be located. The DAS can employ any of several known analog or digital analysis techniques to determine the decay rate from the detector output. In the preferred embodiment, the signal is digitized and then analyzed by a processor.

Figure 10:
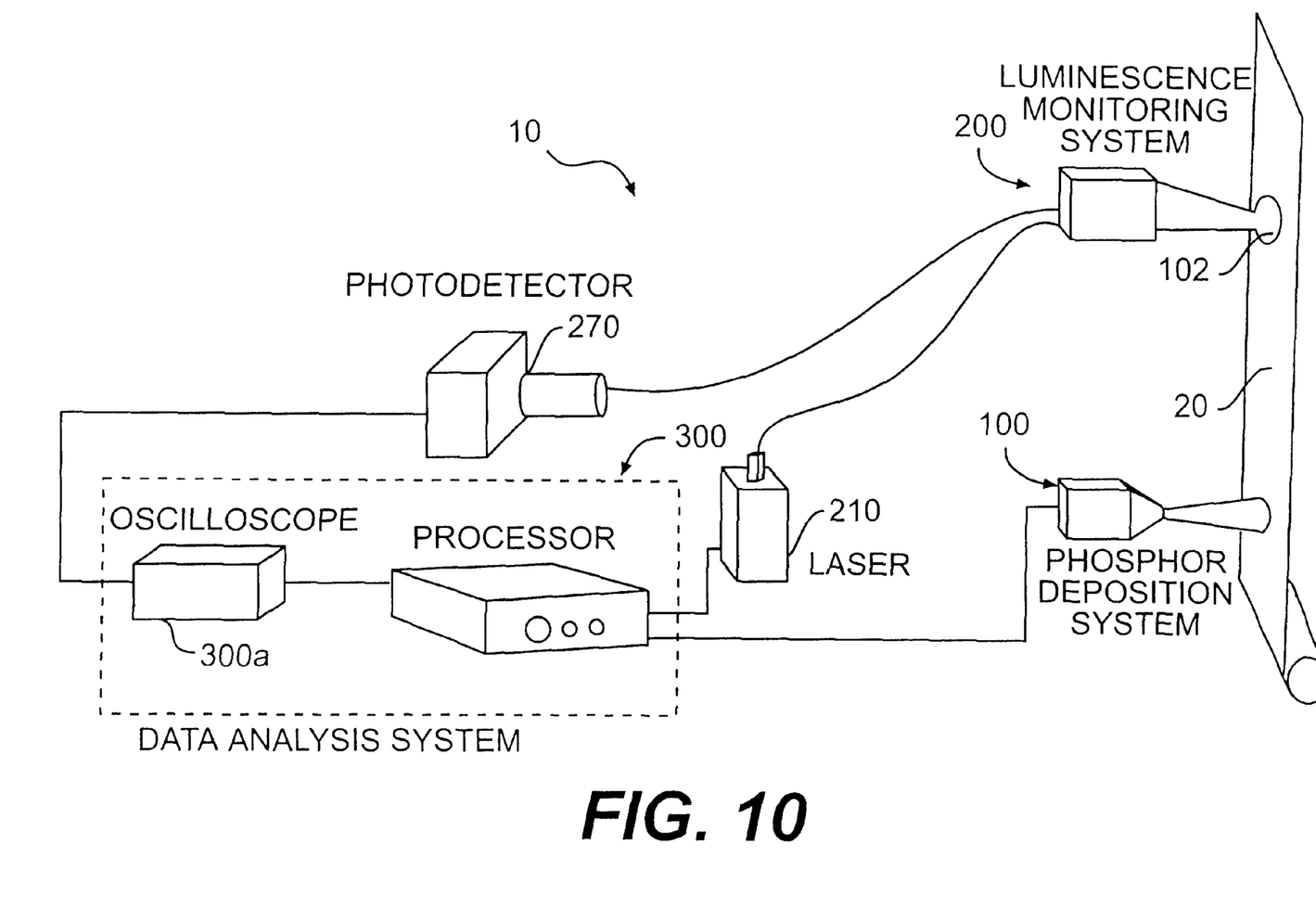
FIG. 10 is a schematic diagram of another embodiment of the phosphor therometry system of the present invention.

The DAS 300 includes an oscilloscope, which can be either a separate instrument (as shown at 300a in FIG. 10) or printed circuit card. A personal computer or other processor analyzes the oscilloscope data to obtain temperature readings under any foreseeable measurement circumstances. The oscilloscope, in either independent or printed circuit card format, collects photomultiplier data as a function of time and stores it in a digital buffer. Built-in algorithms in the oscilloscope or the processor allow the data to be averaged, if called for in the analysis, and transferred into computer memory for further processing.

The waveform can be purged of zeros to eliminate undefined logarithms in the analysis of the data, then subjected to analysis according to the general decay equation $I=I_o e^{-t/T}$, where I=intensity, $I_o$=original intensity, t=time T=decay time.

First, the natural logarithm of the absolute value of the signal data is found. From this, the average value of the logarithmic slope (i.e., decay rate) between two referencing times can be determined. The front end of the photomultiplier signal will include some reflectance of the laser, and will therefore not indicate luminescence. In order to obtain an accurate reading, it is important to isolate the portion of the curve which most closely approximates true exponential decay. The computer determines the reference time range using any of a number of known curve-fitting routines based on the signal amplitude beginning a fraction of a microsecond after the flash of the laser in the LMS. The routine chosen should be quick in order to obtain meaningful real-time data. The same technique should be employed during both calibration and measurement to ensure consistent correspondence between calibration values and measurement values within defined parameters.

The three system components, the PDS, the LMS, and the DAS, can be configured in a number of ways. In one arrangement, each component can be packaged as a separate entity. Coupled with the number of choices available for oscilloscope, light source, and photomultiplier types, this arrangement allows full flexibility for modifying and physically arranging the system to operate in any of a number of possible galvanneal line and other industrial applications.

In another arrangement, the PDS and LMS can both be carried on a common framework for installation on a single mounting fixture. This facilitates the lateral positioning of the LMS with respect to the PDS, better ensuring that the beam is directed onto the phosphor. Another advantage is that only one attachment fixture is required.

The light source itself can be isolated from the rest of the LMS and located with the photomultiplier near or in the DAS. One or two optical fibers (or other large diameter waveguides) can transport light to and from the DAS. In this way, all of the system electronics can be fully isolated from the high temperature region of the galvanneal line and its high frequency heat induction. The analysis electronics will typically be located in a control room with an ambient temperature range of approximately 10° C. (50° F.) to 45° C. (113° F.). This arrangement also minimizes the physical size of the measurement components that must be attached to the galvanneal framework.

In a typical galvanneal process, strip widths can vary from about 75 cm (30 in) to about 250 cm (100 in). The position of the centerline of a strip along the roller can vary as the roll is processed. To accommodate these variations in most lines, the induction furnace platform is repositioned frequently, and is therefore not fixed relative to the strip support structure. To accommodate these changes in juxtaposition between the induction furnace platform and the strip support structure, it is helpful to mount both the powder deposition system and the receiving optics to one structure so that they remain fixed and maintain alignment relative to one another. To avoid contact with the strip as it fluctuates, the powder deposition system and the optics system should be prevented from extending closer than approximately 6 inches to the nominal plane of strip travel.

Figure 7A:
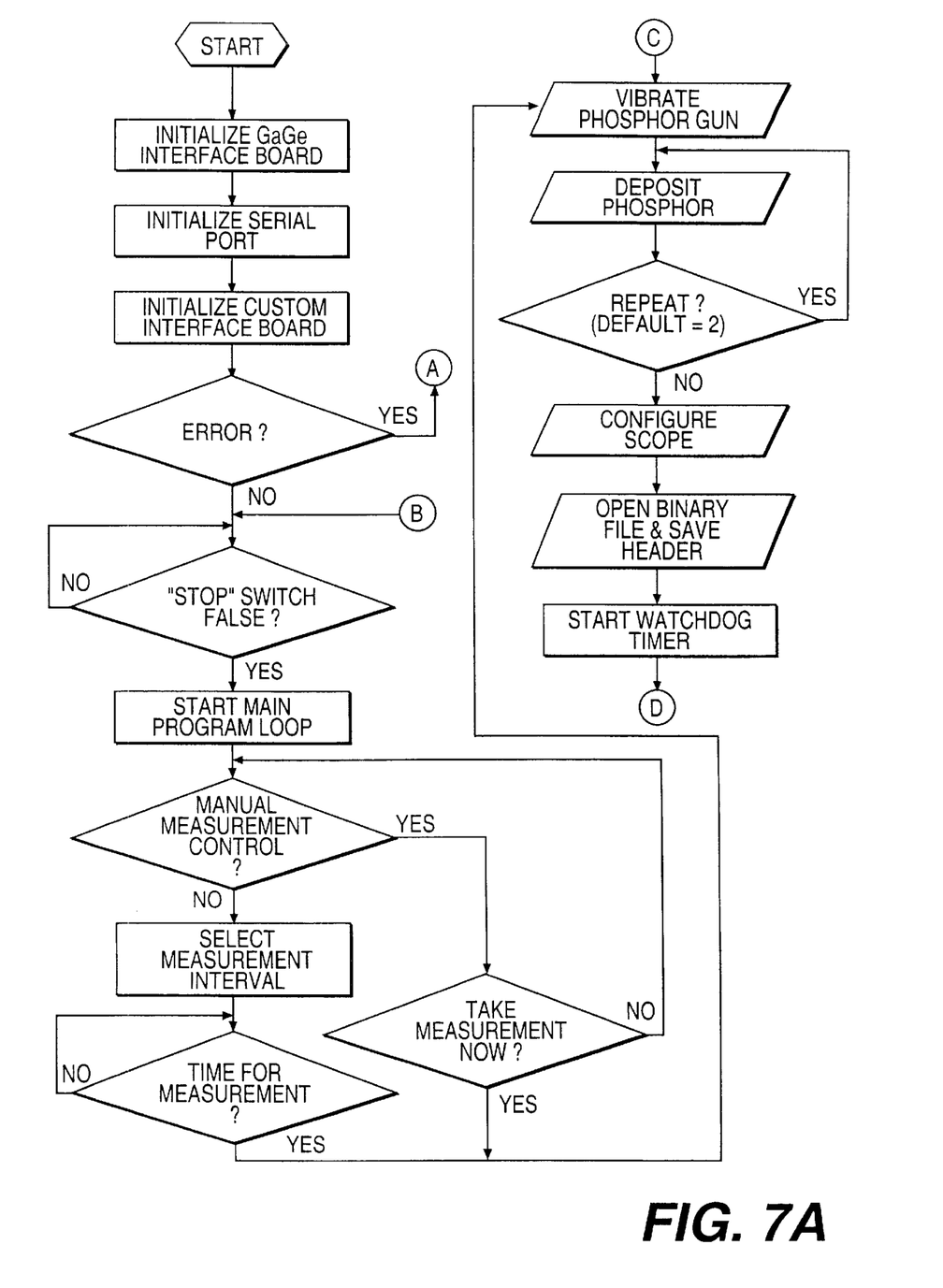
FIGS. 7A through 7C show an illustrative flow chart for the system operation according to one embodiment of the present invention.
Figure 7B:
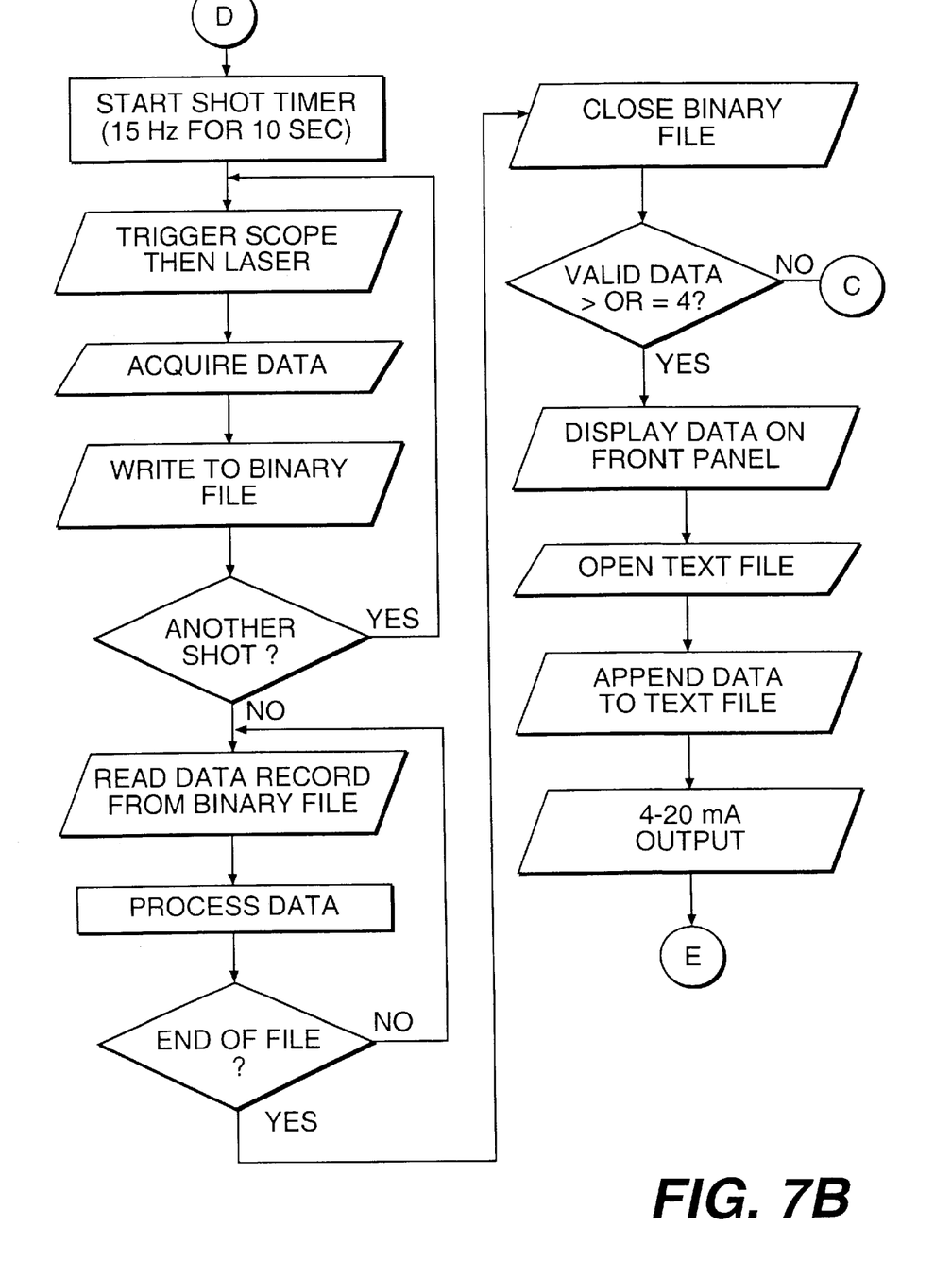
Figure 7C:
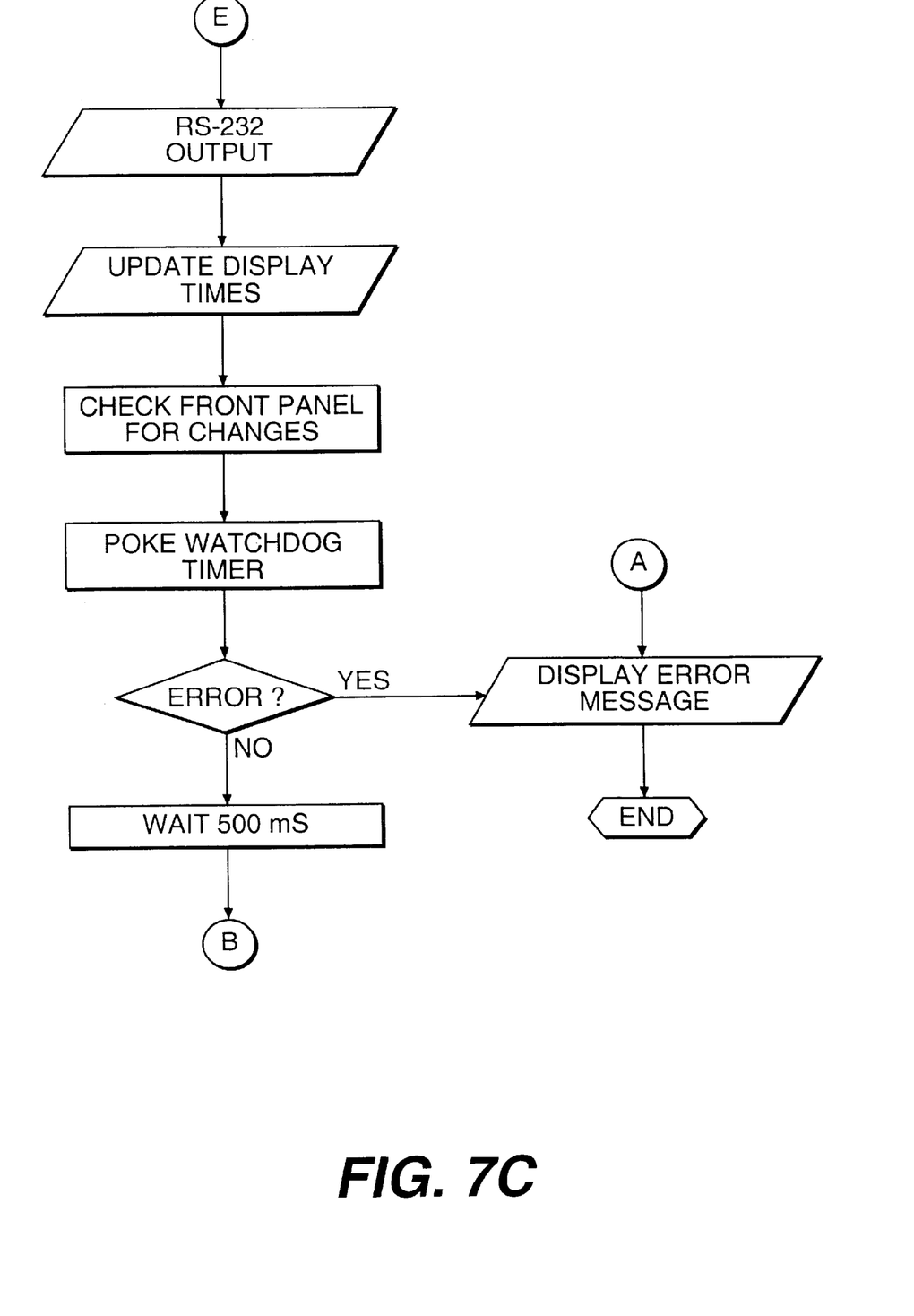

A processor, such as a computer designed or programmed for this purpose, can be implemented to control the operation of the system of the present invention. In the preferred embodiment, it is a personal computer, operating under the control software or firmware. Pursuant to this control, the computer can trigger the spray gun 110 in the PDS to deposit the phosphor on the metal strip, and configure and trigger the oscilloscope to take readings. Shortly thereafter (within a few microseconds), the computer can trigger the laser 210 in the LMS to repeatedly fire, generally beginning before the phosphor spot on the strip reaches the LMS. At this point, the computer can begin reading and storing data output from the oscilloscope. The oscilloscope, laser, and data acquisition cycle can continue for a fixed period of time, or can be interrupted once the data indicates that luminescence is no longer being detected. The computer can then process the stored data. Meaningless data, i.e., data taken before or after the phosphor is in the range of the LMS and therefore not indicating luminescence, can be identified and discarded. The remaining data from each phosphor can be averaged, and the luminescence time decay can be calculated. A calibration function is generally employed to translate the time decays in the temperatures. The computer can be programmed to detect whether the temperature calculated falls within valid parameters, and if it does not, it can recycle the operation immediately. If a valid temperature is calculated, the temperature can be displayed and the system reset for the next measurement interval. FIGS. 7A through 7C show a sample flow chart for the system operation.

As can be seen from this sample flow chart, the processor can initialize the equipment and check for errors before starting the main program loop. Once the main program loop has begun, the processor can determine whether manual or automatic measurement control has been selected, and then initiate the process accordingly. The phosphor gun can then be vibrated and the selected number of phosphor depositions made. Next, the oscilloscope can be configured, and the memory can be set up, and a "watch dog" timer (discussed below) started. The timer for the laser can be initiated followed by triggering the scope and the laser. The data for each laser pulse can then be acquired and written to a memory file. The stored data can then be retrieved and processed. If the data is determined to be invalid, the process can be started again from the point where the phosphor gun is vibrated. If the data is valid, then it can be displayed on the front panel and saved for future use. The watchdog timer can be poked, and it can then be determined whether or not an error has occurred. If so, an error message can be displayed. If not, the main loop program can be started again after a predetermined delay.

The software or firmware for controlling the computer can be independently programmed to perform these functions in any manner well-known in the art. However, National Instruments of Austin, Tex. markets a software package called LabView 3.1.1 Development System for Windows, which is particularly well-suited to be adapted to this application.

Figure 8A:
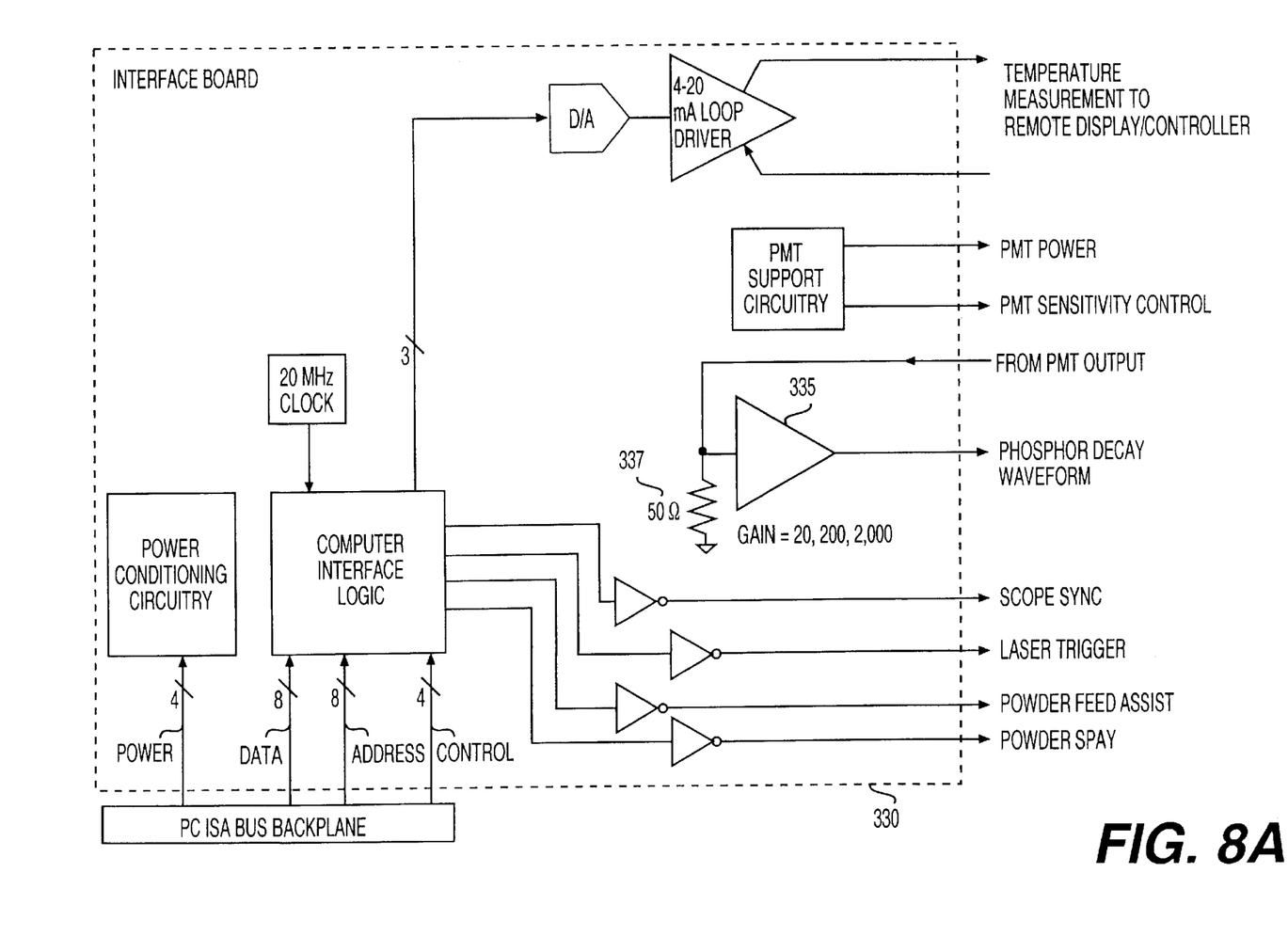
FIG. 8A is a schematic diagram of an embodiment of an interface board of the present invention.
Figure 8B:
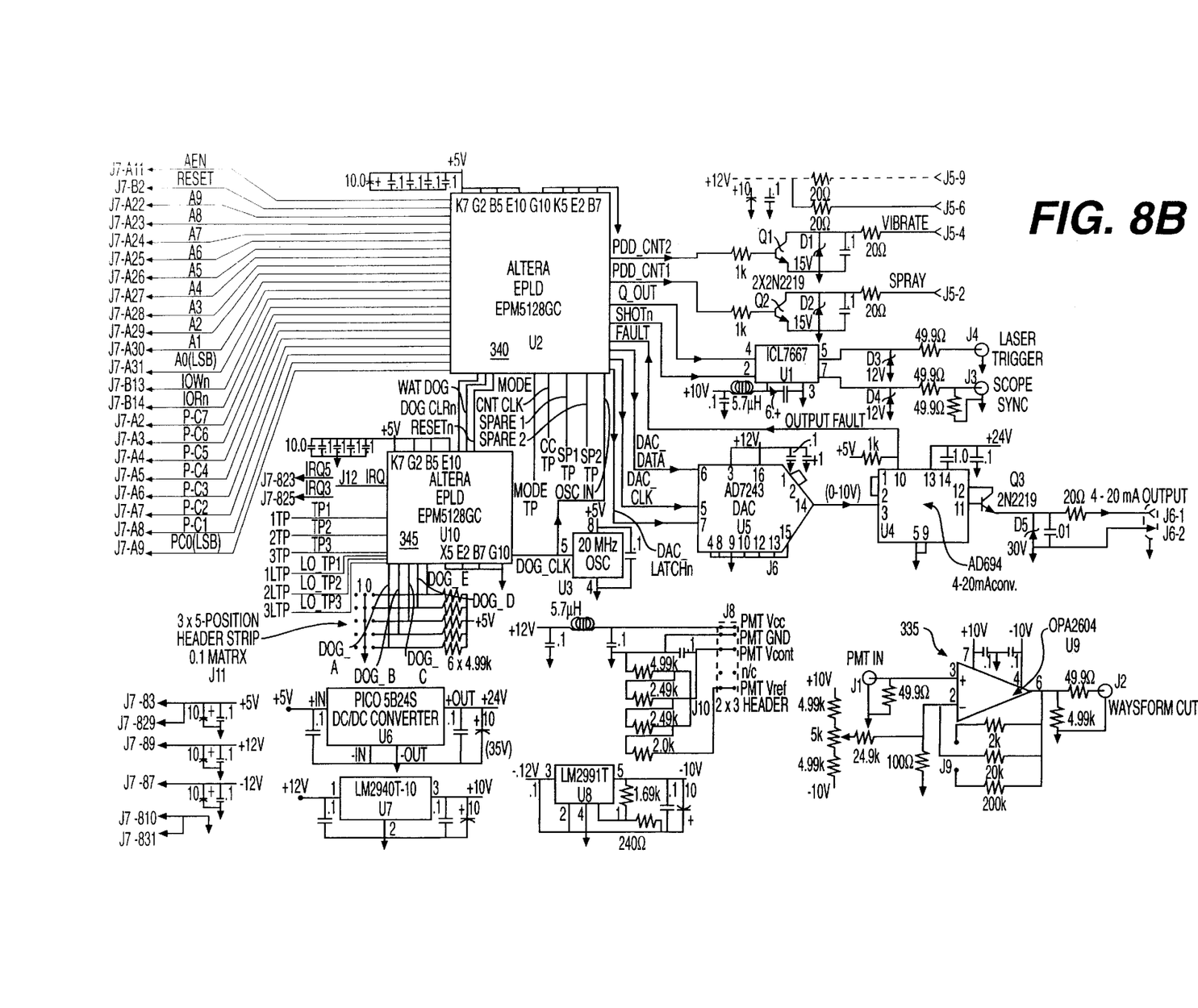
FIG. 8B is a block diagram of the interface board shown in FIG. 8A.

Turning to FIGS. 8A and 8B, in the preferred embodiment, a signal conditioning and interface board, or interface card 330, is installed in the personal computer to provide interface between the personal computer and the other equipment in the system. It also contains an amplifier 335, which boosts the signal from the photomultiplier to a level that is high enough to be conveniently read by the data acquisition card, i.e., oscilloscope, or other waveform monitoring/measuring equipment. The on-board electronics can be powered through a power port available on industry standard architecture (ISA) backplane connections. On-board power converters and regulators can be used to condition the power as needed by the remainder of the electronics.

An erasable, programmable logic device (EPLD) 340 can be used to perform the majority of the digital decoding and processing required to convert pertinent system commands transmitted by the personal computer to the backplane into signals to control the system components. One such signal can trigger the oscilloscope to begin taking samples. A write command from the personal computer can initiate the interface card to generate a sync pulse to the scope card.

One signal can operate the powder deposition system's feed assist solenoid, and another can control the solenoid that fires the powder gun. The phosphor deposition system can be activated by a write command from the personal computer to the interface card 330. For example, one data value can prompt the interface card 330 to transmit a rising-edge 12 volt DC pulse to the deposition system, activating the spray gun. A different data value can terminate the active high pulse, deactivating the spray gun. Software controls can be provided to allow the operator to adjust the duration of the spray period, the number of depositions per cycle, and the time between depositions.

Another signal can trigger the laser to issue an excitation pulse. The laser can be set up and activated by a series of write commands from the personal computer to the interface card 330. Write commands can specify the low and high pulse time of the laser trigger. Data can be provided which sets the laser mode on either one-shot or repeat operation. Another write command can trigger both the laser and the oscilloscope.

A separate socket can be provided for an optional second EPLD 345 that provides a "watch dog" timer function that interrupts the operation if too much time passes without obtaining a reading, indicating an error.

The interface board 330 can generate outputs that provide power to, control the sensitivity of, and receive signals from the photomultiplier 270. The output from the photomultiplier is usually a current signal, generally in the range of 20 microamperes to 20 milliamperes (1 millivolt to 1 volt into 50 ohms), and can be converted on the interface board 330, by means of a 50-ohm resistor 337 or the like, into a voltage signal. This voltage signal can in turn be boosted by the amplifier 335, which may be a fast operational amplifier or the like, for use by the oscilloscope. The signal levels provided to the oscilloscope card are dependent upon the amplifier gain settings. The amplifier can have multiple jumper selectable gains such as 20, 200, and 2000. The photomultiplier sensitivity can also have jumper selectable settings, such as between approximately 100, 1000, and 10,000 A/W. For optimum speed and signal-to-noise performance, the photomultiplier is normally operated at its maximum sensitivity. In this case, the amplifier gain can be set to present near full-scale inputs to the oscilloscope.

The interface board 330 can also include the necessary logic circuits to drive a system display (not shown) based on command signals received from the computer.

The invention, in any of its embodiments, uniquely measures absolute temperature of the highly reflective zinc surface of galvanneal steel by a coordination of phosphor deposition, luminescence production and collection, and time-dependent conversion of optical intensity into an electrical waveform, stored and processed digitally. Coordination of surface dusting with luminescence monitoring allows for both temperature measurement and low perturbation of the material surface.

In actual tests on a galvanneal line, a europium-activated yttrium oxide phosphor (nominally ten micrometer maximum grain diameter) was deposited on the galvanneal as it emerged from the zinc bath. At the washing station after galvannealing, samples were taken and evaluated for residual phosphor and basic surface characteristics. The remaining phosphor was not visible to the naked eye, but could be sensed by blacklight (ultraviolet) activation. There was no discernible effect on paintability, surface gloss, strength, or texture.

Figure 9:
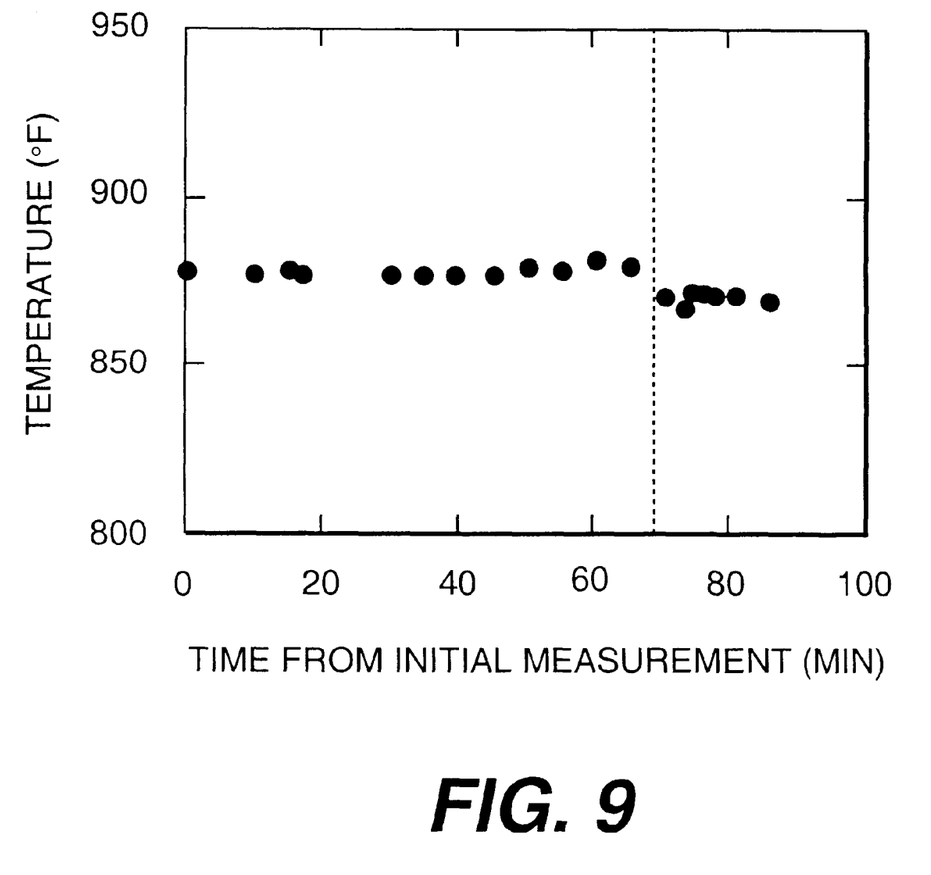
FIG. 9 is a sample data plot obtained by the system of the present invention.

FIG. 9 shows some example data taken over a 100 minute period. The temperatures were in the range between 860 and 880° F. (460 to 470° C.). The data indicates that a process change occurred approximately 70 minutes into the run, which resulted in a slight decrease in sheet temperature.

Although specific embodiments of the present invention have been described above in detail, it will be understood that this description is merely for purposes of illustration. Various modifications of and equivalent structures corresponding to the disclosed aspects of the preferred embodiments described above may be made by those skilled in the art without departing from the spirit of the present invention, which is defined in the following claims.

What is claimed:

1. An apparatus for measuring the temperature of a moving substrate, comprising;

a deposition mechanism which sprays a phosphor onto the substrate while the substrate is moving substantially at an operating speed, where the phosphor assumes the temperature of the substrate;

a radiation source which directs transient excitation energy onto the phosphor on the substrate while the substrate is still moving substantially at the operating speed, in response to which the phosphor emits a luminescence with a decay characteristic indicative of the temperature of the phosphor;

a photodetector which detects the luminescence and produces an electrical signal that is characteristic of the brightness of the luminescence; and a processor to analyze the electrical signal to determine the decay characteristic of the luminescence and to determine the temperature of the phosphor from the decay characteristic.

2. The apparatus of claim 1, further comprising a collection lens disposed to focus the luminescence for detection by the photodetector.

3. The apparatus of claim 1, wherein the photodetector is a photomultiplier.

4. The apparatus of claim 1, further comprising an oscilloscope for providing a digital output signal based on the electrical signal from the photodetector, and the processor determines the decay characteristic from the digital output signal.

5. The apparatus of claim 1, wherein the phosphor is powdered.

6. The apparatus of claim 5, wherein the deposition mechanism includes:

a pressurized air source;

a switching valve connected to an output of the pressurized air source to produce air pulses;

a powder reservoir for containing powdered phosphor and having an outlet port; and an air gun having a powder inlet port in communication with the outlet port of the powder reservoir, an air inlet port in communication with the pressurized air source, and an outlet nozzle spaced from and directed toward the moving substrate, the air gun being activated by the air pulses to spray controlled amounts of the powdered phosphor.

7. The apparatus of claim 6, wherein the processor actuates the switching valve and the radiation source.

8. The apparatus according to claim 6, wherein the deposition mechanism is positioned so that the outlet nozzle is spaced from the moving substrate by a nominal distance of approximately six inches.

9. The apparatus according to claim 5, wherein the powdered phosphor is dry.

10. The apparatus according to claim 9, wherein the dry, powdered phosphor is undiluted.

11. The apparatus of claim 1, wherein the decay characteristic is a decay rate.

12. The apparatus according to claim 1, further comprising collection optics through which the luminescence passes to the photodetector, wherein the deposition mechanism and the collection optics are mounted to a common structure.

13. The apparatus according to claim 1, wherein the processor activates the deposition system and the radiation source.

14. The apparatus of claim 1, wherein the radiation source is a laser and the excitation energy is light pulses.

15. A method for measuring the temperature of a moving substrate, comprising the steps of:

spraying a phosphor onto the substrate while the substrate is moving substantially at an operating speed, where the phosphor assumes the temperature of the substrate;

directing transient excitation energy onto the phosphor on the substrate while the substrate is still moving substantially at the operating speed, in response to which the phosphor emits a luminescence with a decay characteristic indicative of the temperature of the phosphor;

detecting the luminescence;

producing an electrical signal that is characteristic of the brightness of the luminescence;

analyzing the electrical signal to determine the decay characteristic of the luminescence; and determining the temperature of the phosphor from the decay characteristic.

16. The method of claim 15, wherein the moving substrate is hot-dipped galvanneal steel.

17. The method of claim 16, wherein the phosphor is powdered.

18. The method of claim 17, wherein the phosphor is selected from the group consisting of $Mg_4(F)GeO_6$:Mn, $YVO_4$:Eu, $YVO_4$:Dy, $Y_2O_3$:Eu, and $Y_2O_3$:Dy.

19. The method of claim 16, wherein the temperature of the hot-dipped galvanneal steel is in the approximate range of 450 to 700° C.

20. The method of claim 16, wherein the excitation energy is light pulses.

21. The method of claim 15, wherein the phosphor is powdered.

22. The method of claim 15, wherein the excitation energy is light pulses.

23. The method of claim 15, wherein the decay characteristic is decay rate.

24. The method of claim 15, further comprising the step of, prior to analyzing the electrical signal, digitizing the electrical signal.

25. An apparatus for measuring the temperature of a moving substrate, comprising:

a pressurized air source;

a switching valve connected to an output of the pressurized air source to produce air pulses;

a powder reservoir for containing a phosphor and having an outlet port;

an air gun having a powder inlet port in communication with the outlet port of the powder reservoir, an air inlet port in communication with the pressurized air source, and an outlet nozzle spaced from and directed toward the substrate, the air gun being activated by the air pulses to spray controlled amounts of the powdered phosphor onto the substrate while the substrate is moving substantially at an operating speed, where the phosphor assumes the temperature of the substrate;

a laser that produces light pulses;

optics that direct the light pulses onto the phosphor on the substrate while the substrate is still moving substantially at the operating speed, in response to which the phosphor emits a luminescence with a decay rate indicative of the temperature of the phosphor;

a collection lens disposed to focus the luminescence;

a photodetector that detects the luminescence focused by the collection lens and produces an electrical signal that is characteristic of the brightness of the luminescence;

an oscilloscope for providing a digital output signal based on the electrical signal from the photodetector; and a processor to analyze the digital output signal to determine the decay characteristic of the luminescence and to determine the temperature of the phosphor from the decay characteristic.

26. An apparatus for measuring the temperature of a moving substrate having a molten surface, comprising:

a deposition mechanism that sprays a dry, powdered phosphor onto the molten surface of the moving substrate while the substrate is moving substantially at an operating speed, where the phosphor assumes the temperature of the moving substrate;

a radiation source that directs transient excitation energy onto the phosphor on the moving substrate while the substrate is still moving substantially at the operating speed, in response to which the phosphor emits a luminescence with a decay characteristic indicative of the temperature of the phosphor;

a photodetector that detects the luminescence and produces an electrical signal that is characteristic of the brightness of the luminescence; and a processor to analyze the electrical signal to determine the decay characteristic of the luminescence and to determine the temperature of the phosphor from the decay characteristic.

27. The apparatus according to claim 26, wherein the processor activates the deposition system and the radiation source.

28. The apparatus of claim 26, wherein the deposition mechanism includes:

a pressurized air source;

a switching valve connected to an output of the pressurized air source to produce air pulses;

a powder reservoir for containing powdered phosphor and having an outlet port; and an air gun having a powder inlet port in communication with the outlet port of the powder reservoir, an air inlet port in communication with the pressurized air source, and an outlet nozzle spaced from and directed toward the moving substrate, the air gun being activated by the air pulses to spray controlled amounts of the powdered phosphor.

29. The apparatus of claim 28, wherein the processor actuates the switching valve and the radiation source.

30. The apparatus according to claim 28, wherein the deposition mechanism is positioned so that the outlet nozzle is spaced from the moving substrate by a nominal distance of approximately six inches.

31. The apparatus according to claim 28, wherein the powder reservoir contains dry, powdered phosphor, in undiluted form.

32. The apparatus of claim 26, wherein the decay characteristic is a decay rate.

33. The apparatus according to claim 26, further comprising collection optics through which the luminescence passes to the photo-detector, wherein the deposition mechanism and the collection optics are mounted to a common structure.

34. A method for measuring the temperature of a moving substrate having a molten surface, comprising the steps of:

spraying a dry, powdered phosphor onto the molten surface of the moving substrate while the substrate is moving substantially at an operating speed, where the phosphor assumes the temperature of the moving substrate;

while the substrate's surface is still molten, and while the substrate is still moving substantially at the operating speed, directing transient excitation energy onto the phosphor on the moving substrate, in response to which the phosphor emits a luminescence with a decay characteristic indicative of the temperature of the phosphor;

detecting the luminescence;

producing an electrical signal that is characteristic of the brightness of the luminescence;

analyzing the electrical signal to determine the decay characteristic of the luminescence; and determining the temperature of the phosphor from the decay characteristic.

35. The method of claim 34, wherein the decay characteristic is decay rate.

36. The method of claim 34, further comprising the steep of, prior to analyzing the electrical signal, digitizing the electrical signal.

37. The method of claim 34, wherein the temperature of the moving substrate is at least about 450° C.

38. The method of claim 34, wherein the moving substrate is hot-dipped galvanneal steel.

39. The method of claim 38, wherein the temperature of the hot-dipped galvanneal steel is in the approximate range of 450 to 700° C.

40. The apparatus according to claim 34, wherein the dry, powdered phosphor is undiluted.

* * * * *